Oct. 18, 1955  H. S. SOMMERS, JR  2,721,320
SIGNAL COMPARISON SYSTEM
Filed Sept. 18, 1945

INVENTOR
HENRY S. SOMMERS JR.
BY
ATTORNEY 2,721,320
Patented Oct. 18, 1955

2,721,320

SIGNAL COMPARISON SYSTEM

Henry S. Sommers, Jr., Belmont, Mass., assignor, by mesne assignments, to the United States of America, as represented by the Secretary of the Navy Application September 18, 1945, Serial No. 617,142

7 Claims. (Cl. 343—7.4)

My invention relates to a means for detecting the presence of an object by energy reflected therefrom, and more particularly to a means whereby the direction of said object is determined by simultaneous reception of said reflected energy by a plurality of energy detecting devices.

In devices for detecting the presence of an object by energy reflected therefrom, most methods of reasonably accurate azimuth discrimination based on the principle of comparing two signals received on either side of the target (such as lobe switching or conical scanning) have the undesirable feature that the two signals compared are not received at the same instant of time and are therefore influenced differently by the reflectance of the target and atmospheric conditions. Such fading and modulation effects cause considerable uneven pulse jitter and tend to make automatic tracking unstable.

My invention operates upon the principle of receiving a plurality of reflected signals from a given object in space at the same time, the receiving means being oriented in space so as to determine the position of said object, and delaying said signals one relative to the other whereby the magnitudes of said signals may be easily compared.

Accordingly it is an object of my invention to provide a means for simultaneously receiving electromagnetic reflected signals from either side of an object in space.

Another object is to provide a means for determining the direction of an object in space which will be unaffected by atmospheric fluctuations, modulation effects, and other types of interference.

A further object is to provide a means for receiving electromagnetic energy reflected from an object moving in space which will be unaffected by atmospheric fluctuations, modulation effects, and other types of interference whereby the moving object can be automatically tracked in space by supplementary means.

Other and further objects will appear in the course of the following description when taken with the accompanying drawings in which.

Figure 1:
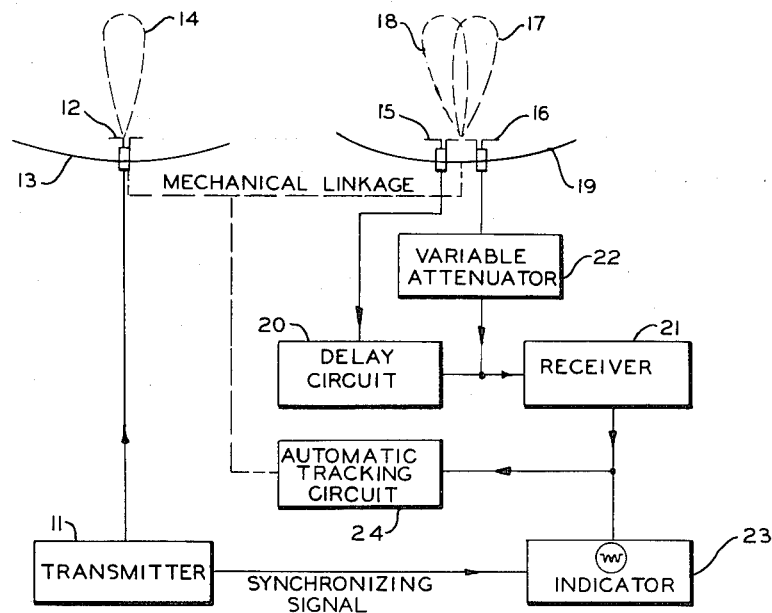
Fig. 1 shows a schematic block diagram of an embodiment of my invention.

In Fig. 1 a transmitter 11 is a source of electromagnetic energy which is fed to a radiating antenna, comprising a dipole 12 and reflector 13. This antenna, which is directed toward any desired object by suitable mechanical means, has a directional beam pattern 14. Energy reflected from said desired object will impinge upon the receiving antenna comprising dipoles 15 and 16, having directional beam patterns 17 and 18 respectively whose axes of directivity diverge by some fixed angle, and a reflector 19. Suitable mechanical linkage is provided between the transmitting and receiving antennas so that both point at the same position in space at all times. Energy received by dipole 15 passes through a delay circuit 20 before being conveyed to the input of receiver 21 while that received by dipole 16 passes through a variable attenuator 22 before being conveyed to the same receiver input. This attenuator 22 introduces no time delay—merely an attenuation loss equal to that produced in the other signal channel by delay circuit 20.

The output of receiver 21 is divided into two channels. One channel feeds the input of an indicator 23, which also receives a synchronizing signal from transmitter 11, providing visual indications of the relative magnitudes of the energy received by dipoles 15 and 16. The second channel conveys the same receiver output to the input of an automatic tracking circuit 24, which converts the electrical signals into a mechanical output that is connected to the antennas, moving their axes toward the weaker received energy signal and hence providing automatic tracking for said antennas.

Figure 2:
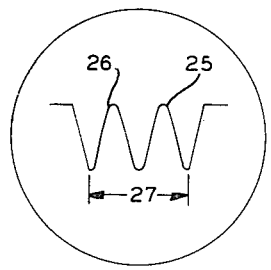
Fig. 2 shows a typical target response on the indicator shown in Fig. 1.

In Fig. 2 the visual indications 25 and 26 on the indicator 23 are dependent in magnitude upon the magnitude of the energy received by dipoles 16 and 15 respectively, and as shown are centered in a range gate 27. The details of circuits necessary to produce such visual indications and range gate are known to the art and need not be given here.

In a certain test model of the embodiment of Fig. 1, reflectors 13 and 19 were parabolic in shape, dipole 12 being placed at the focal point of reflector 13, and dipoles 15 and 16 being placed a short distance either side of the focal point of reflector 19. 100 feet of compactly coiled standard wave guide were employed as the delay circuit 20, resulting in delaying the energy received by dipole 15 a period of time approximately equal to the pulse duration of the pulsed electromagnetic energy emitted from dipole 12. This relationship is desirable so that the two indications will be separate and distinct yet as close together as possible in time relationship. The use of a single receiver 21 is desirable since it overcomes the extreme difficulty of designing two radio frequency channels and two amplifiers which will remain identical for any length of time in use.

While I have described particular embodiments of my invention as required by the Patent Statutes, the principles of this invention are of broader application which will be apparent to those skilled in the art.

What I claim is:

1. A system for detecting the presence of an object by energy reflected therefrom, comprising in combination, a transmitter and associated radiating antenna for producing a beam of pulsed electromagnetic energy, a receiving antenna similarly aligned comprising a parabolic reflector with two dipoles disposed on opposite sides of the focal point of said parabolic reflector, whereby the similar beam patterns of each dipole diverge from one another by a definite fixed angle, a receiver, a variable attenuator coupling one of said dipoles to said receiver, delay means coupling the other of said dipoles to said receiver, said delay means being adapted to delay the output of said other dipole a predetermined time interval relative to the output of said one dipole, and an indicator connected to the output of said receiver for visually displaying in space relationship signals proportional in magnitude to the magnitudes of energy received by said dipoles.

2. In a system for detecting the presence of an object by energy reflected therefrom, means for producing a beam of pulsed electromagnetic energy, attenuating means, delay means, a first means for receiving energy of said beam reflected from said object in the path of said beam operatively coupled to said attenuating means, a second means for simultaneously receiving energy of said beam reflected from said object in the path of said beam operatively coupled to said delay means, whereby the energy output of said delay means is spaced a definite time interval relative to the energy output of said attenuator, an indicator, and means for applying the output of said attenuator and said delay means to said indicator.

3. In a system for detecting the presence of an object by energy reflected therefrom, means for producing a beam of discontinuous wave energy, first and second energy receiving means adapted to simultaneously receive energy reflected from said object in the path of said beam, means coupled to only one of said receiving means for delaying the energy output of said one receiving means for definite time interval relative to the output of said other receiving means, and indicator means coupled to the outputs of said other receiving means and said delay means for providing a visual display of the magnitudes of said outputs.

4. In a system for detecting the presence of an object by pulsed energy reflected therefrom, the combination comprising, first and second antenna means normally operative to simultaneously receive energy reflected from said object, a receiver, means normally coupling said first antenna means to said receiver, time delay means normally coupling said second antenna means to said receiver and operative to delay the output of said second antenna a predetermined time interval relative to the output of said first antenna means, and an indicator coupled to the output of said receiver for visually displaying the magnitudes of energies applied to said receiver from said first and second antenna means.

5. In a system for detecting the presence of an object by pulsed energy reflected therefrom, the combination comprising, a receiver, antenna means adapted to simultaneously receive first and second quantities of reflected energy free of interaction, means connecting said antenna means to said receiver, said connecting means being adapted to delay said first quantity of energy a definite time interval relative to said second quantity of energy, and an indicator coupled to said receiver and adapted to indicate the relative strength of said first and second quantities of received energy.

6. In a system for detecting the presence of an object by energy reflected therefrom the combination comprising, means for producing a single beam of pulsed electromagnetic energy having an axis of directivity directed toward said object, first and second antenna means normally operative to simultaneously receive energy reflected from said object, said first and second antenna elements each having a directional reception pattern with an axis divergently displaced from said axis of directivity, said reception patterns being slightly divergent with respect to each other, a receiver, means coupling said first antenna means to said receiver and operative to transmit energy from said first antenna to said receiver, time delay means normally coupling said second antenna means to said receiver and operative to delay a predetermined time interval relative to the energy output of said first antenna the energy transmitted from said second antenna to said receiver, and means responsive to the relative strength of the signals received by said receiver for maintaining said beam of energy and said reception patterns trained on said object.

7. A system for detecting the presence of an object by energy reflected threfrom comprising in combination, a transmitter and associated radiating antenna for producing a beam of pulsed electromagnetic energy, a receiving antenna comprising a parabolic reflector and two dipoles disposed on opposite sides of the focal point of said reflector, said dipoles having differently directed beam patterns, a receiver, a variable attenuator coupling one of said dipoles to said receiver, delay means coupling the other of said dipoles to said receiver, said delay means operating to delay the output of said other dipole a predetermined time interval relative to the output of said one dipole, an indicator connected to the output of said receiver adapted to provide a visual display in spaced time relationship of the output signals of the receiver, said signal display providing an indication of the magnitudes of reflected energy received at said dipoles, and automatic tracking means including driving mechanism for directing said antennas, said automatic tracking means being coupled to the output of said receiver.

References Cited in the file of this patent

UNITED STATES PATENTS

| | | |
|---|---|---|
| 1,491,372 | Alexanderson | Apr. 22, 1924 |
| 2,046,849 | Runge et al. | July 7, 1936 |
| 2,251,708 | Hefele | Aug. 5, 1941 |
| 2,400,641 | Hardy | May 21, 1946 |
| 2,406,970 | Smith | Sept. 3, 1946 |
| 2,409,462 | Zworykin | Oct. 15, 1946 |
| 2,412,612 | Godet | Dec. 17, 1946 |
| 2,427,029 | Stearns | Sept. 9, 1947 |
| 2,468,751 | Hansen et al. | May 3, 1949 |
| 2,489,304 | Marchand et al. | Nov. 29, 1949 |
| 2,508,384 | Gross | May 23, 1950 |
| 2,509,207 | Busignies | May 30, 1950 |